United States Patent
Fox, Jr.

[11] 3,905,576
[45] Sept. 16, 1975

[54] VALVES WITH LOW OPENING AND CLOSING GATE FRICTION AGAINST THE SEATS

[76] Inventor: Carl B. Fox, Jr., 1240 Post Oak Tower, 5051 Westheimer, Houston, Tex. 77027

[22] Filed: Sept. 12, 1972

[21] Appl. No.: 288,372

Related U.S. Application Data

[63] Continuation-in-part of Ser. No. 35,134, May 6, 1970, abandoned.

[52] U.S. Cl. ............ 251/327; 251/DIG. 2; 251/368
[51] Int. Cl. ............................................. F16k 3/18
[58] Field of Search ...... 251/DIG. 2, 194, 195, 197, 251/327, 167, 175

[56] References Cited
UNITED STATES PATENTS

| | | | |
|---|---|---|---|
| 468,029 | 2/1892 | McKim | 251/197 |
| 2,349,368 | 5/1944 | Myers | 251/DIG. 2 |
| 3,017,158 | 1/1962 | Hansen et al. | 251/167 X |
| 3,021,861 | 2/1962 | Billeter et al. | 251/DIG. 2 |
| 3,038,692 | 6/1962 | Holmes | 251/167 |

FOREIGN PATENTS OR APPLICATIONS
972,826 10/1959 Germany .......................... 251/327

Primary Examiner—Arnold Rosenthal
Attorney, Agent, or Firm—Carl B. Fox Jr.

[57] ABSTRACT

Gate valves having gate elements which bend away from the seats so that there is no sliding friction between the valve elements and the seats. The valves may have gate elements which are flexible and are flat when against the seats and rolled up when withdrawn from the seats, or may have flexible gate elements of loop form which are rolled to positions over the seats. The invention may be applied to gate valves having gates which are essentially non-flexible, i.e. of steel or other metal, yet are formed to be flexible enough that the lower gate ends may be bent away from the seats so that pressure across the gate elements is relieved whereby sliding friction between the gate and seat is substantially reduced.

13 Claims, 16 Drawing Figures

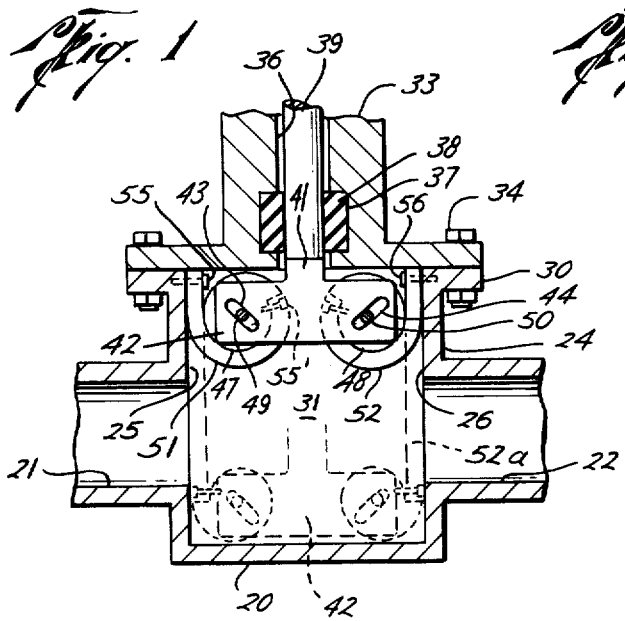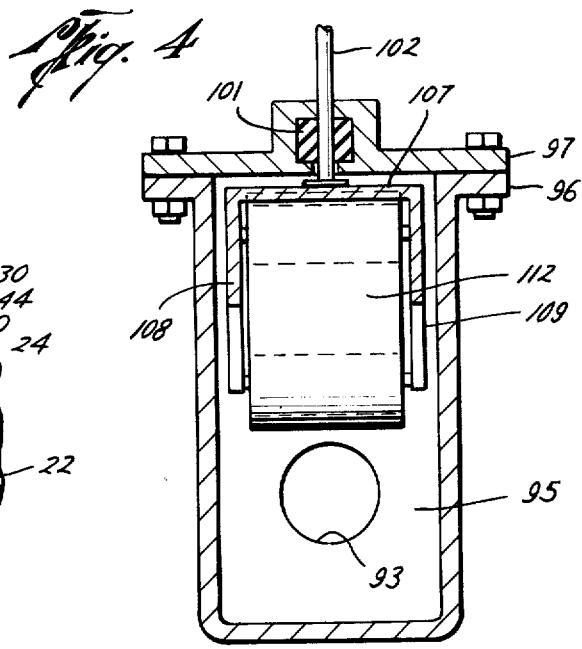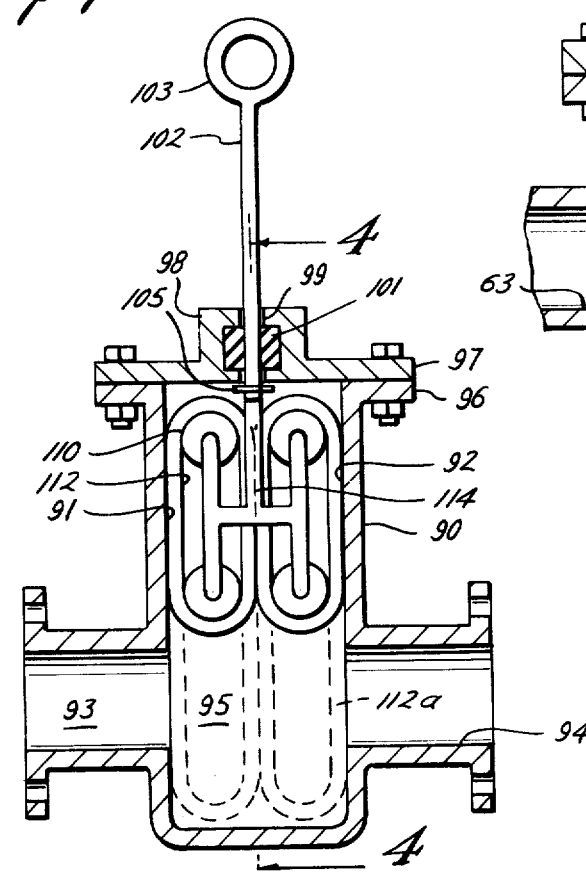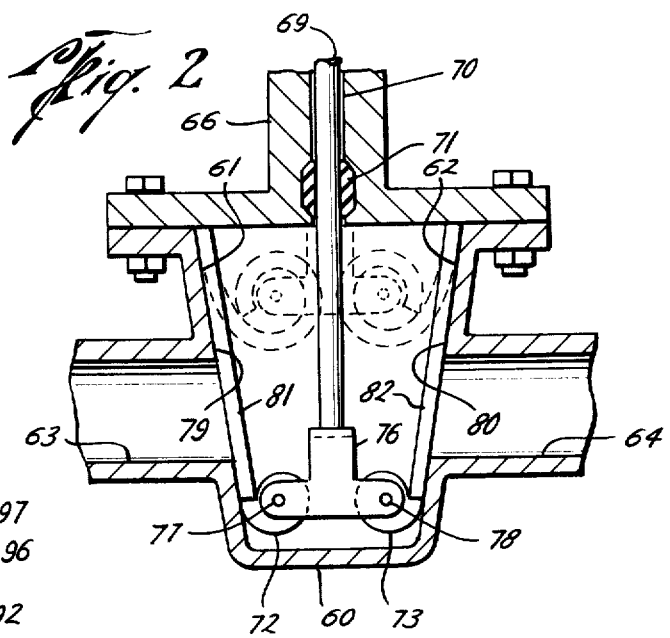

INVENTOR.
Carl B. Fox, Jr.

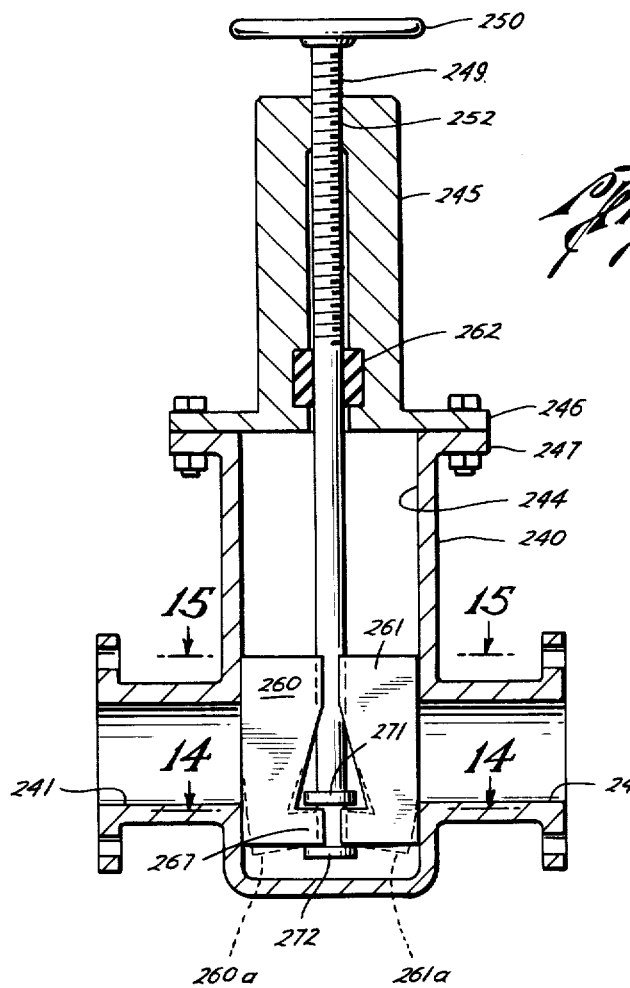
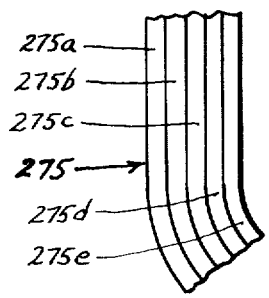
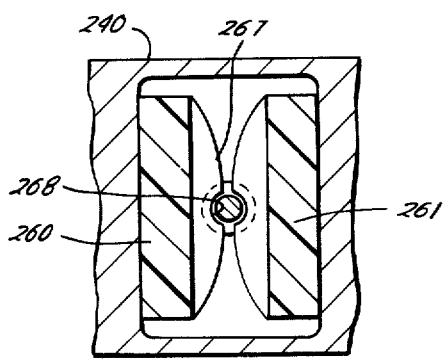
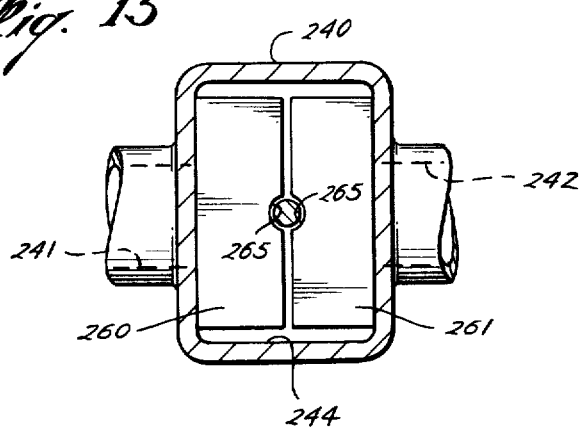

3,905,576

VALVES WITH LOW OPENING AND CLOSING GATE FRICTION AGAINST THE SEATS

REFERENCE TO EARLIER APPLICATION

This application is a continuation-in-part of application Ser. No. 35,134 filed May 6, 1970, now abandoned.

BACKGROUND OF THE INVENTION

The valves contemplated by the invention are of relatively small sizes, and valves of the water gate type and of other very large types are not contemplated.

One fundamental problem with gate valves is that the gates must be slid over the seats on closing and opening motions of the gates. Because of fluid pressure differences across the gates, the gate-seat sliding friction may be very high so that considerable force is necessary to open or close the valve, particularly on opening the valve since the gate motion must be commenced when the full line pressure is across the gate.

This invention solves the described problems. The gates in some forms of the invention are made flexible such that they may be rolled away from the seats against which they lie when the valve is closed, or may be of loop form to be rolled from the seats. In the case of metal valve gates which are essentially non-flexible, yet which are formed at their lower ends to be flexible enough that their lower ends may be bent away from the seats, pressure differential across the gates may be relieved by so doing before the full opening movement of the gates is undertaken.

An important advantage of the invention is that in most cases the valve stem may be substantially reduced in size so that valve stem pressure is substantially reduced, i.e. the internal valve pressure pushing outwardly against the cross sectional area of the stem is reduced because the stem is of smaller diameter. The valve opening and closing forces are very much reduced since with no or reduced seat-gate friction the force necessary to move the gate from the seat is very low, at times virtually zero in magnitude.

Other objects and advantages of the invention will appear from the following descriptions of preferred embodiments and from the accompanying drawings.

BRIEF DESCRIPTIONS OF THE DRAWINGS

FIG. 1 is a vertical cross sectional view showing a preferred form of valve apparatus according to the invention.

FIG. 2 is a vertical cross sectional view showing a modified form of valve apparatus according to the invention.

FIGS. 3–4 are vertical cross sectional views, taken respectively parallel to and perpendicular to the planes of the valve gates, showing another modified form of valve apparatus according to the invention.

FIG. 13 is a vertical cross sectional view showing another form of valve apparatus according to the invention.

FIGS. 14–15 are horizontal cross sectional views taken at lines 14—14 and 15—15 of FIG. 13.

FIG. 16 is a partial elevational view showing another modified form of gate according to the invention.

DESCRIPTIONS OF THE PREFERRED EMBODIMENTS

Figure 5:
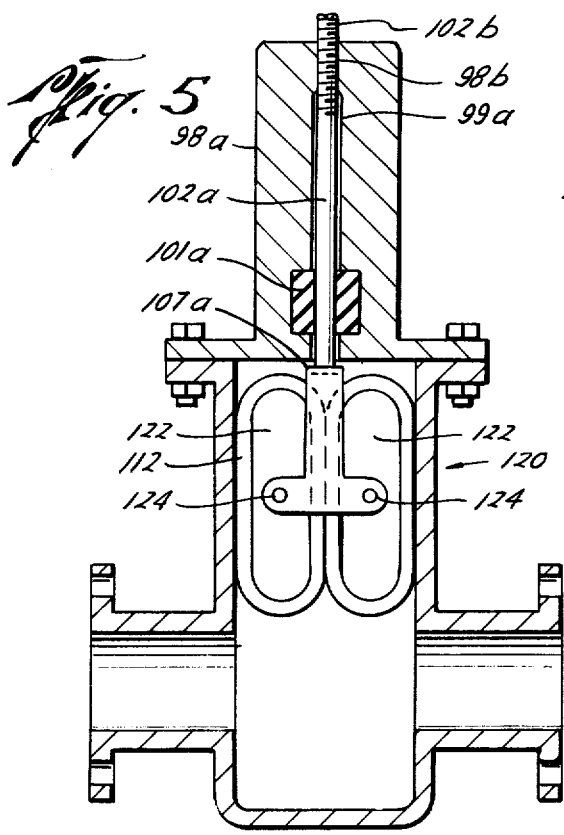
FIG. 5 is a vertical cross sectional view of yet another form of apparatus according to the invention.

Referring first to FIG. 1 of the drawings, the valve therein shown has a hollow body or housing 20 with inlet-outlet ports 21, 22 opening thereinto at opposite sides. The side walls 23, 24 are inwardly flat to form the seat surfaces 25, 26, respectively. A flange 30 surrounds the upper end of the valve body, around the upper opening of the valve chamber 31. A flanged bonnet 33 is bolted by a plurality of bolts 34 to the valve body flange. A suitable pressure seal (not shown) may be provided between the bonnet and body. The bonnet 33 has a downwardly extending passage 36 therethrough around which is provided a packoff chamber 37 containing packing 38. The valve stem 39 extends downwardly through passage 36 to be sealed therearound by packing 38 to prevent fluid pressures within chamber 31 from escaping from chamber 31.

Stem 39 terminates downwardly in a yoke 41 each side of which is in the form of a plate 42 having a pair of opposed angular slots 43, 44 therethrough. The slot directions are shown to be downwardly convergent, but may be horizontal or downwardly divergent, so long as they have horizontal extent the purpose of which will be later made clear. A pair of rollers 47, 48 are respectively provided with pins or shafts 49, 50 engaged in the slots 43, 44 at each side of the yoke, there being another side plate 42 at the opposite ends of the rollers 47, 48.

A flexible gate element 51 is disposed around roller 47, and a flexible gate element 52 is disposed around roller 48. The rollers 47, 48 are curved so as to leave a radial shoulder 53 of width equal to the flexible gate element thickness so that the gate element may be fixed thereto at their lower ends, e.g. by screws 49, as shown, with the effective roller surface including the gate element being uniformly smooth therearound. The upper end of gate element 51 is fixed to the upper end of seat surface 25 by a pin or screw 55, while the upper end of gate element 52 is similarly affixed to the upper end of seat surface 26 by pin or screw 56.

When stem 39 is moved axially downwardly, the gate elements 51, 52 are unwound from the rollers 47, 48, respectively, and moved to flat positions against the seat surfaces 25, 26, respectively. The downwardly converging inclinations of slots 43, 44 move the respectively roller pins or shafts 49, 50 outwardly as downward stem force is applied, the pins moving to the upper ends of the slots. When the gate elements are wound on the rollers in the upward positions of the rollers, the gate elements may be such as to touch together as shown in FIG. 1. When the rollers are moved downwardly to close the valve, there is space between the rollers equal to four times the gate thickness.

If fluid flow through the valve is from the lefthand side toward the righthand side, i.e. is entering through port 21 and leaving through port 22, then gate element 52 in flat position 52a is forced by fluid pressure to against seat 26 to stop the flow. Since gate 52 is sealed against seat 26, the flow volume through the valve is reduced so that the fluid does not unduly distort the position of valve element 51 which in this case would have no flow-sealing effect. If fluid flow is from the opposite side of the valve incoming through port 22 and outgoing through port 21, then valve gate element 51 seals off the flow and gate element 52 is idle.

To open the valve, the stem 39 is moved upwardly, whereupon inclined slots 43, 44 urge roller pins or shafts 59, 50 toward one another, thereby lifting the lower ends of the gates from the seats as the gates are rolled onto the rollers, commencing at the lower ends of the gates, so that pressure differential across the valve is decreased. Since the gates are rolled away incrementally from the seats, only a very slight force will lift each gate from its seat to commence the valve opening movement. There is no pressure differential across the gates at all once the valve are substantially opened in this manner, and the entire valve operation is free of gate-seat friction and thereby accomplished with very little stem force.

Referring now to FIG. 2 of the drawings, the valve therein shown has a housing or body 60, the opposite interior walls 61, 62 thereof being upwardly divergent, angular one to the other. Housing 60 has inlet-outlet port 63 and inlet-outlet port 64. The bonnet 66 is affixed to the valve body by bolting flanges as in the case of the valve of FIG. 1. Stem 69 extends downwardly through passage 70 having packing 71 therearound to seal valve chamber pressure from escape. Rollers 72, 73 are like the rollers 47, 48 of FIG. 1. The stem yoke terminates in inverted "T" plate 76 at each end of the pair of rollers, and the roller pins or shafts 77, 78 are engaged through circular openings through the yoke plates. The valve of FIG. 2 operates as the valve of FIG. 1, except that the inclinations of valve chamber sides 61, 62 are such that the unrolling of the gate elements 81, 82 corresponds to the reductions of roller diameters as the gate elements are unwound therefrom so that stem yoke slots such as slots 43, 44 are not required. The gates unwind from around the rollers in contact with the seats 79, 80 at all elevations of upward and downward travel of the rollers 72, 73.

Referring now to FIGS. 3 and 4 of the drawings, the valve therein shown has a hollow housing or body 90 having interior flat seat wall surfaces 91, 92 around the inlet-outlet ports 93, 94 at opposite sides of the valve chamber 95. Body 90 has a flange 96 around its upper end to which is bolted the edges or flange 97 of bonnet 98. Bonnet 98 has a stem passage 99 downwardly though its center around which is provided packing 101 surrounding and sealing around stem 102. The stem is shown to have a finger loop 103 at its upper end for use in moving the stem upwardly and downwardly, but other stem movement means may be provided as desired. The provision of loop 103 indicates the low opening and closing force required for operation of the valve. A stop 105 outwardly projecting around the stem below the bonnet is provided to limit upward stem movements. At its lower end, stem 102 carries a yoke 107 the opposite side 108, 109 of which are of "H" form. A cylindrical roller 110 is disposed for rotation between the upper and lower ends of each vertical member of the "H" shaped formation of the yoke. A pair of identical valve gate belts 112 are disposed around each pair of vertically aligned rollers 110, the belts preferably touching one another at 114, between the inner runs of each of the belts or loops. When stem 102 is moved downwardly, the belts 112 roll downwardly, maintaining contact therebetween at 114 until they cover the inner ends of the ports 93, 94, as is shown by the dashed line belt positions 112a. Depending on the direction of fluid flow across the valve, one or the other of the belts 112 will be tightly sealed to the corresponding seating surface 91 or 92 to seal off flow through the valve. Again, as the flow is shut off by one gate element forced against its seat by fluid pressure, the flow through the valve is reduced so that the other, inactive, gate is not subjected to dislocating fluid forces. Since the gates roll upwardly and downwardly between the open and closed positions thereof, very little force through stem 102 is required for opening and closing of the valve, so that the stem cross section may be very small, thereby reducing stem pressure thrust to a very small amount. If the stem packing 101 pressure on the stem is sufficient, the stem packing friction will suffice to hold the valve in closed position.

If, for example, the internal valve fluid pressure is 100 psi, and the stem 102 has a diameter of one inch, then the force on the stem will be approximately 75 pounds. If, on the other hand, the stem diameter is only one-tenth of an inch, then the pressure force on the stem will be only one one hundredth as great, or about 1 pound. Yet with the reduced forces required for operation of the vavles described herein, the smaller stem will be sufficiently strong for valve opening and closing. The valve cost will thereby be reduced by the lack of requirement for heavy stems and stem threads, all of which add to the cost and weight of valves.

Referring now to FIG. 5 of the drawings, there is shown a valve 120 which is similar in most respects to the valves shown in FIGS. 3 and 4. The bonnet 98a is of modified form, having upper threads 98b around the upper end of stem passage 99a engaged with threads 102b. Packing 101a seals around the stem within the bonnet. To move the stem downwardly, threads 102b are rotated to move downwardly through threads 98b, reverse stem rotation accomplishing raising of the stem. Instead of the rollers 110 of FIGS. 3–4, the valve gate belts 112 are disposed around solid members 122, which are of vertically elongate block form having upper and lower semi-circular curved ends over which the gate belts slide. Blocks 112 are preferably of meterial such that the belts will slide readily thereover, such as Teflon or Teflon-cated construction. The yoke 107a has opposite sides of inverted T-shaped, the belt blocks 122 being connected thereto by shafts or screws 124.

Figure 6:
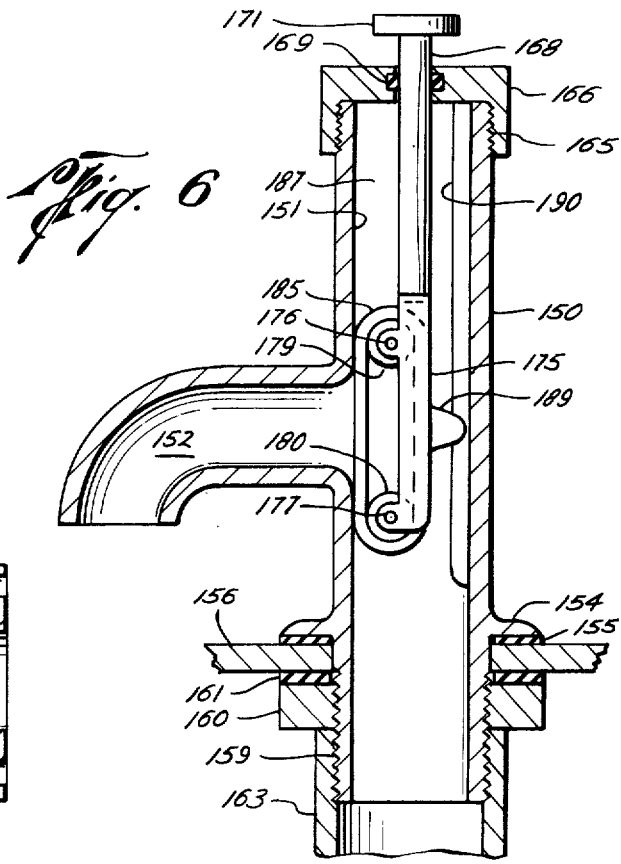
FIG. 6 is a vertical cross sectional view showing a valve of faucet type according to the invention.

Referring now to FIG. 6 of the drawings, there is shown a valve of the faucet type, such as are commonly used for kitchen, bathroom, and outside water faucets of homes. The valve body 150 has a flat interior wall 151, forming the valve seat, from which extends an outwardly and downwardly curved outlet passage 152. Body 150 has a lower flange 154 which rests upon a gasket 155 which in turn rests upon the surface of a wall or partition 156 upon which the faucet is mounted. The body 150 is exteriorly threaded at 159 and a nut 160 screwed on these threads against a wahser 161 securely connects the faucet body to the wall 156. An inlet conduit 163 is screwed to the lower end of threads 159. The upper end of body 150 is exteriorly threaded at 165 and a cap 166 is screwed thereon. Cap 166 has a preferably central opening through which stem 168 is disposed, a seal being formed around the stem within the opening by packing 169. A disc-shaped handle 171 is shown carried at the upper end of stem 168. Stem 168 is offset (toward the viewer) at its lower portion 175. A pair of cross rods 176, 177 extend horizontally, vertically spaced, from the offset stem portion preferably axially centered below the upper portion of the stem. Rollers 179, 180 are rotatively disposed upon rods 176, 177, respectively. A belt 185, forming the gate or closure, is disposed looped around the two rollers. The opposite well 187 of the valve body interior prevents the belt from moving off of the rollers and the rollers from moving off the rods. A flat projection 189 at a side of stem 168 slides between a pair of inwardly projecting vertical ribs 190 (only one being shown) to prevent rotation of the stem. To operate the valve, the stem is grasped by the hand at disc 171, which is pulled upwardly or downwardly to open or close the valve, respectively. The belt 185 rolls upwardly and downwardly along surface 151, and when in the down position covers the inlet to port 152 so that leakage is unlikely to occur. Since fluid pressures need not be overcome when the valve is closed, very little force on stem 168 is required in either opening or closing of the valve. Packing 169 friction holds the small cross-section stem where positioned. When the valve is open, belt 185 is rolled incrementally upward from the lower edge of the inlet to port 152 so that flow commences gradually and is easily controlled as the stem is moved further upward. Downward stem movement closes the valve. To replace the belt 185, it is only necessary to unscrew cap 166, pull the stem and rollers from the valve interior, and then simply to remove and replace the belt 185.

Figure 7:
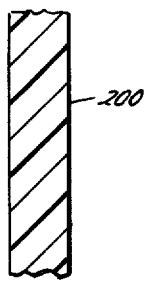
FIGS. 7–10 are partial cross sectional views taken along the lengths of four types of gates according to the invention.
Figure 8:
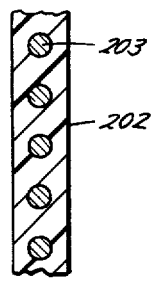
Figure 9:
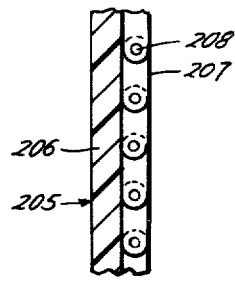
Figure 10:
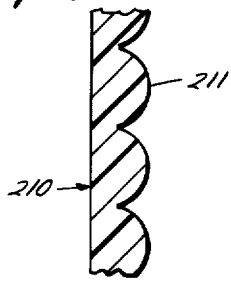

Referring now to FIGS. 7-10 of the drawings, four examplary forms of belts which may be employed in connection with the invention are shown. The seating surfaces of the belts are at the left. The gate belt 200 of FIG. 7 is shown to be of flexible material such as rubber, synthetic rubber, or plastic. These materials, of proper composition, have sufficient flexibility for use in the invention. In FIG. 8, gate belt 202 is of elastomeric material as is belt 200 of FIG. 7, and contains a plurality of cross rods of reinforcing material such as steel, other metal, pastic or the like, the latter being indicated by reference numeral 203. The belt 205 of FIG. 9 includes a layer 206 of elastomeric material backed up by a hinged metal mesh 207 containing links connected at pins 208, and adapted to bend only in one direction. The belt 210 of FIG. 10 is of elastomeric material and has at its rearward side spaced cross projections of hemispherical form referred to by reference numeral 211.

Figure 11:
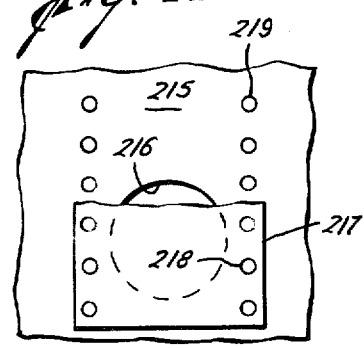
FIGS. 11–12 are partial elevational views of modified gates according to the invention.
Figure 12:
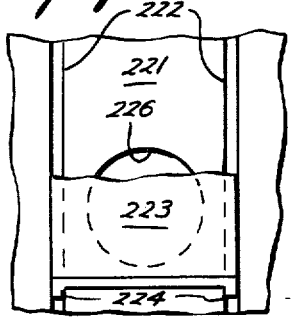

The flexible gates may be made of a commerically available type of rubber or plastic which has transversly disposed longitudinal metal fibers or particles imbedded therein. The particles are small, and may be lined up in one direction by magnetism during manufacture. The particles cause the rubber or plastic to be stiffer transversely than longitudinally. One such belt material is manufactured by Gates Rubber Company of Denver, Colorado In FIG. 11 there is shown a portion 215 of a valve seat intercepted by a flow port 216. The belt 217 has along each of its edges a plurality of spaced openings 218. Seat 215 has therealong a plurality of spaced projecting knobs 219 over which the belt openings engage as the belt is rolled therealong, the belt being of loop form as in FIGS. 3-6. The engagements of the knobs 219 into the openings 218 reinforces the belt transversely so that increased pressures may be employed with valves incorporating this modification. A similar modification is shown in FIG. 12 wherein seat 221 has therealong a pair of spaced slots 222, the belt 223 having edge ribs 224. The ribs engage into the slots, thereby securing the belt edges against movements toward the flow port 226, so that higher pressure differential across the belt may be utilized without failure of the belt, for example, sucking of the belt into the flow port 226.

Referring now to FIGS. 13-14 of the drawings, the gate valve shown has a hollow body 240 having opposite inlet-outlet ports 241, 242 from valve chamber 244. Bonnet 245 is bolted at its lower flange 246 to upper flange 247 of body 240. A threaded stem 249 having wheel 250 at its upper end for rotating the stem is threaded through bonnet threads 252, and extends therebelow to the lower ends of gates 260, 261. Packing 262 seals around the stem at the bonnet.

Gates 260, 261, usually formed of metal, when lowered by the stem close the inner ends of ports 241, 242, respectively. The gates are flat at their outer faces to flushly seal against the chamber seating surfaces about the ports, or may be otherwise adapted to seal with such seating surfaces. The gates each have a curved vertical recess 265 at their inner sides to provide space for stem 249, and are beveled and thinned at their inner sides at their lower portions as shown to be more flexible longitudinally at those portions.

At or near the lower end of each gate, there is an integral inwardly projecting stem-engagement lug 267 having a curved vertical recess 268 to relatively closely surround the stem. Some clearance exists between the opposite lugs 267. Stem 249 has circular enlargements 271, 272 spaced to receive the lugs 267 somewhat freely yet closely therebetween. Rotation of stem 249 in one direction to lower the stem causes enlargement 271 to move lugs 267 and both gates down to close the valve.

When the valve is closed under fluid pressure, rotation of the stem in the other direction to raise the stem causes enlargement 272 to move against lugs 267 in a gate-opening direction. If the gate-seat friction is such that the gates do not begin at once to move upwardly, then the bearing of enlargement 272 against the undersides of lugs 267 will tend to curl the lower more longitudinally flexible ends of the gates upwardly and inwardly as shown by dashed line positions 260a, 261a, so that a slight port clearance by the gates at the lower sides of the ports is accomplished, so that fluid can pass the gates and differential pressure is reduced to make the gates easier to raise.

Referring now to FIG. 16 of the drawings, there is shown a gate structure 275 which is adaptable for use with any of the valves shown in FIGS. 1-6 and 11-12. The gate 275 is formed of plural superposed sheets or layers of material such as metal, plastic, rubber, fabric, and impregnated fabric, the layers being indicated by reference numerals 276a-276c. The layers of a gate may be of the same material, or layers of different materials may be employed. The layers may be very thin or may be relatively thick. The material may be hard or soft, and elastomeric or not. Each layer must be capable of bending around a roller, or the like, as the gate is rolled over or away from the valve port. The layers together may form a strong gate structure which may be used in relatively high fluid pressure valve service. For example, the layers may be formed of thin spring steel, which is very strong and yet which will bend as required. The layers are smooth-faced and are flushly placed one against the other to act together as a composite gate element. A very effective gate element may be formed of alternate metal and plastic or rubber layers. The layers are normally not adhered together, so that the bending of the layers is not hindered.

In each form of valve herein disclosed, the valves are pressed toward their seats, particularly during closing movements of the valves. In FIG. 1, slots 43, 44 urge the rollers 47, 48 toward seats 25, 26, respectively, upon downward movement of elements 42. In FIG. 2, the rollers 72, 73 and gates 81, 82 are back-to-back to press the gates against the seats in all positions. In FIGS. 3–4 and 5 the rollers and endless belts 112 are back-to-back so that the belts are constantly held against the seats. In FIG. 6, element 189 holds the rollers 179, 180 and belt 185 against the seat. In FIGS. 13–15, the back-to-back gates are mutually pressed toward the seats. In each case, the gates are controlled and constrained in position at all times, so that positive seating of the gates occurs. Upon closing of each form of valve, the gate is pressed toward the seat as it closes, and is then held against the seat by the constraining means as well as by the fluid pressure behind the gate. Where the gates are disposed back-to-back, the resiliency of the gates assists in biasing the gates toward the opposite seats.

While preferred embodiments of the invention have been shown in the drawings and described, many modifications thereof may be made by persons skilled in the art without departing from the spirit of the invention, and it is intended to protect by Letters Patent all forms of the invention falling within the scope of the following claims.

I claim:

1. Valve of the type for use in piping and plumbing systems and pipelines, comprising a valve body, said valve body being hollow to form an enclosed valve chamber therewithin and having two flow ports therethrough extending from the exterior of said valve body to opposite sides of said chamber, a pair of gate means in said chamber each having a surface adapted to seal against an interior surface of said valve body around the chamber end of one of said flow ports to close the flow port, a valve stem opening through said valve body transverse to said flow ports having packing means therearound, a valve stem longitudinally slidably and sealedly disposed through said stem opening and packing means and connected to said gate means, longitudinal movements of said valve stem moving said gate means between a valve closed position covering said chamber ends of said flow ports and a valve open position exposing said chamber ends of said flow ports, each said gate means having a trailing lower end portion to which said valve stem is connected which is flexibly bendable away from said interior surface of said valve body around said chamber end of one of said flow ports upon initial movement of said gate means from said valve closed position to at least partially crack open said flow ports, said flow ports being open unobstructed passages having no supports thereacross for said gate means, each of said gate means having reinforcing means transverse to the direction of bending of said gate means upon initial opening movement to prevent bending of said gate means in said transverse direction.

2. The combination of claim 1, there being two said gate means closing aligned flow ports at opposite sides of said chamber, each said gate means comprising a longitudinally flexible and transversely less flexible strip, said gate control means including roller means around which each said strip is wound when the valve is open, said gate control means biasing each said roller means toward the seat during gate closing movement and biasing each said roller means away from the seat during gate opening movement.

3. The combination of claim 2, said seat surfaces around said flow ports at opposite sides of said chamber being parallel, said gate control means including opposed angular slot means into which the ends of said roller means are journaled, the angularity of each slot causing biasing of each said roller toward the seat during gate closing movement and causing biasing of each said roller away from the seat during gate opening movement.

4. The combination of claim 2, said seat surfaces around said flow ports at opposite sides of said chamber being equally angularly convergent in the direction of gate closing movement, the seat angularities retaining said gate means in contact in all positions between open gate position and closed gate position.

5. The combination of claim 1, there being two said gate means closing aligned flow ports at opposite sides of said chamber, each said gate means comprising a longitudinally flexible and transversely less flexible endless belt, and said gate control means comprising spaced roller means around which each said belt is disposed flushly against the seat, and means for biasing the roller means toward the seats.

6. The combination of claim 5, said gate means being disposed one against the other to mutually bias each roller means and gate means toward its seat.

7. The combination of claim 5, each said gate means comprising a body of elastomeric material having elongate reinforcing fibers imbedded throughout alinged in a direction transverse to the directions of gate movement and parallel to the seat.

8. The combination of claim 1, each said gate means comprising a rigid metal plate thinned transversely thereacross relative to other portions of the gate means adjacent its trailing end portion to be longitudinally bendable at said thinned portion, the remainder of said gate means being sufficiently thick to provide said reinforcement against transverse bending whereby upon gate opening movement of the gate means by said stem means each gate means is bent at said transversely thinned portion.

9. The combination of claim 1, each said gate means comprising a body of elastomeric material having elongate reinforcing fibers imbedded throughout alinged in a direction transverse to the directions of gate movement and parallel to the seat.

10. Gate valve, comprising a valve body having an enclosed valve chamber therewithin and having a pair of opposite flow ports extending from said chamber to the exterior of said valve body, a pair of gates disposed within said chamber movable simultaneously longitudinally of the gates between open and closed positions with respect to said flow ports, each said gate having transverse relief means thereacross at its side away from the flow port which it is movable to close spaced from the trailing end of the gate with regard to the direction of opening movement of the gate, and a valve stem extending sealedly through a valve stem opening having seal means therearound provided through said valve body into said chamber from the exterior of said valve body in a direction longitudinal of said gates and engaged only with the trailing end of each of said gates with respect to the opening direction of movement of the gates beyond said transverse relief means, opening movement of said valve stem when a gate is stuck against opening causing bending of said stuck gate at said transverse relief means to raise the portion of the gate between said transverse relief means and the trailing end of the gate from the flow port to relieve any differential pressure across the gate as a hindrance to opening of the gate.

11. The combination of claim 10, said transverse relief means of each said gate being disposed across the port adjacent the trailing side of the port with respect to gate opening direction, the gate area over which differential hydrostatic pressure across the gate acts to hinder said bending of the gate thereby being small.

12. The combination of claim 10, said transverse relief means having a triangular cross section.

13. The combination of claim 10, said trailing end of each gate extending inwardly away from the flow port which it controls and said stem being engaged only with said inward extension to increase the leverage of gate bending at said transverse relief means upon gate opening movement of said stem.

* * * * *